United States Patent [19]
Hasuda et al.

[11] Patent Number: 5,875,368
[45] Date of Patent: Feb. 23, 1999

[54] FOCAL PLANE SHUTTER DEVICE

[75] Inventors: Masanori Hasuda; Takashi Matsubara, both of Yokohama, Japan

[73] Assignee: Nikon Corporation, Tokyo, Japan

[21] Appl. No.: 829,960

[22] Filed: Apr. 1, 1997

Related U.S. Application Data

[60] Provisional application No. 60/037,951 Feb. 20, 1997.

[30] Foreign Application Priority Data

Apr. 1, 1996 [JP] Japan ................................. 8-078059

[51] Int. Cl.$^6$ ..................................................... G03B 9/40
[52] U.S. Cl. ........................................... 396/484; 396/487
[58] Field of Search .................................... 396/483, 484, 396/486, 487

[56] References Cited

U.S. PATENT DOCUMENTS 5,467,160  11/1995  Matsubara et al. ..................... 396/484

Primary Examiner—David M. Gray

[57] ABSTRACT

A focal plane shutter device which, regardless of the number of times of operation, does not lose precision of operation. The shutter device has bend portions disposed in drive arms which drive shutter blades. The convex portions of the bend portions (ridge portions) face an adjacent shutter baseplate side. These bend portions reduce or eliminate friction as between caulking pins connecting blades to the drive arms, thereby increasing reliability.

11 Claims, 5 Drawing Sheets

FOCAL PLANE SHUTTER DEVICE

CROSS-REFERENCE TO RELATED APPLICATION

This application claims the benefit of priority from Japanese Application No. 08-078,059, filed Apr. 1, 1996, the contents of which are incorporated herein by reference. This application also claims the benefit of the provisional application filed Feb. 20, 1997 entitled A FOCAL PLANE SHUTTER DEVICE and having a Ser. No. 60/037,951 filed Feb. 20, 1997.

BACKGROUND OF THE INVENTION

The present invention relates to a focal plane shutter device used on a photographic apparatus, for example, a camera or an electronic still camera. In known focal plane shutter devices, drive arms, which drive the shutter blade(s), are straight. As users request more and more detailed pictures, and new types of picture presentations, increases in film sensitivity and quicker, more reliable shutter speeds are required. Increased shutter speeds require more reliability and precision from the shutter blades and the drive arms. However, in known shutter devices, having straight drive arms, as the shutter performs more operations, the blind speed (speed of the shutter blades) of the shutter varies dramatically. Such inconsistency leads to diminished shutter precision in proportion to the number of shutter operations.

SUMMARY OF THE INVENTION

Accordingly, it is an object of the present invention to increase the reliability and precision of the operation of a focal plane shutter device.

It is also an object of the present invention to reduce differences in blind speed as subsequent operations of a focal plane shutter device.

It is a further object of the present invention to provide a focal plane shutter device capable of producing more detailed pictures.

It is yet a further object of the present invention to reduce friction in the operation of a focal plane shutter device so as to increase the precision of the operation of the focal plane shutter device.

It is yet a further object of the present invention to reduce the effects of wear and tear on the operation of a focal plane shutter device.

Additional objects and advantages of the invention will be set forth in part in the description which follows, and, in part, will be obvious from the description, or may be learned by practice of the invention.

Objects of the present invention are achieved by a focal plane shutter device comprising a shutter baseplate, a drive arm movably supported by the shutter baseplate, the drive arm having a bend portion with a ridge portion on a side facing the shutter baseplate and a trough portion on an opposite side, and at least one shutter blade supported by the drive arm.

Objects of the present invention are also achieved in a drive arm for a shutter having a first portion rotatably supported by the shutter, a second portion adapted to receive a supporting mechanism of at least one shutter blade, and a bent portion between the first portion and the second portion.

Objects of the present invention are achieved in a shutter device having a baseplate provided with an aperture, a plurality of shutter blades, a drive arm having a first end rotatably supported by the baseplate and adapted to move the plurality of shutter blades from a closed position covering the aperture to an open position away from the aperture, the drive arm having a second end being bent away from said baseplate.

Objects of the present invention are also achieved in a shutter device having a first baseplate provided with a first aperture, a second baseplate provided with a second aperture, a front blind group, a front blind main arm having a first end rotatably supported between the first baseplate and the second baseplate, the front blind main arm having a second end bent away from the first baseplate with respect to the first end of the front blind main arm, a front blind follower arm rotatably supported at a first end between the first baseplate and the second baseplate, the front blind follower arm cooperating with the front blind main arm to move the front blind between a closed position blocking the first and second apertures and an open position allowing light to pass through the first and second apertures.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
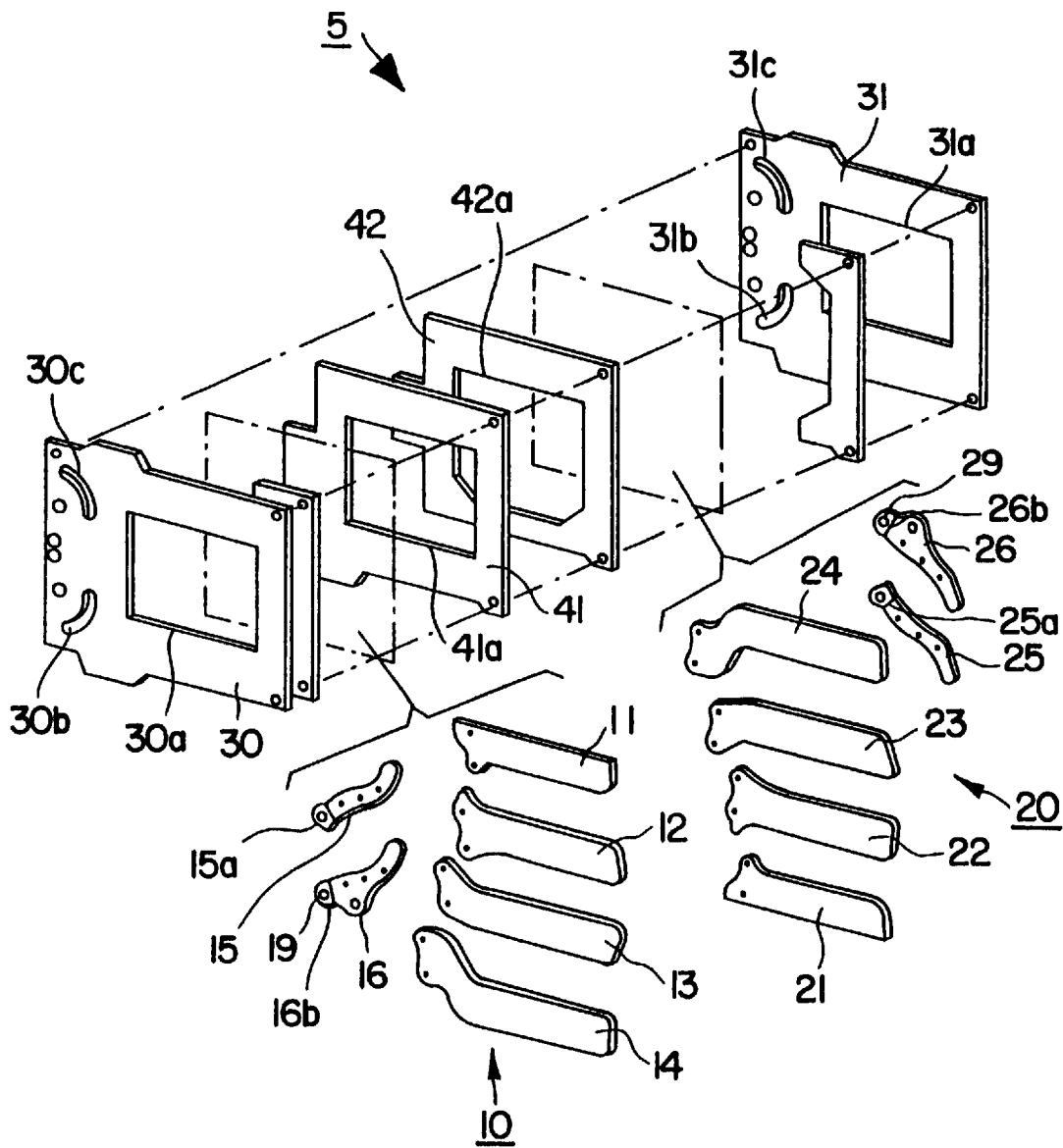
FIG. 1 is an exploded oblique view of a focal plane shutter device in accordance with the preferred embodiments of the present invention.

Reference will now be made in detail to the present preferred embodiments of the present invention, examples of which are illustrated in the accompanying drawings, wherein like reference numerals refer to like elements throughout.

Figure 2:
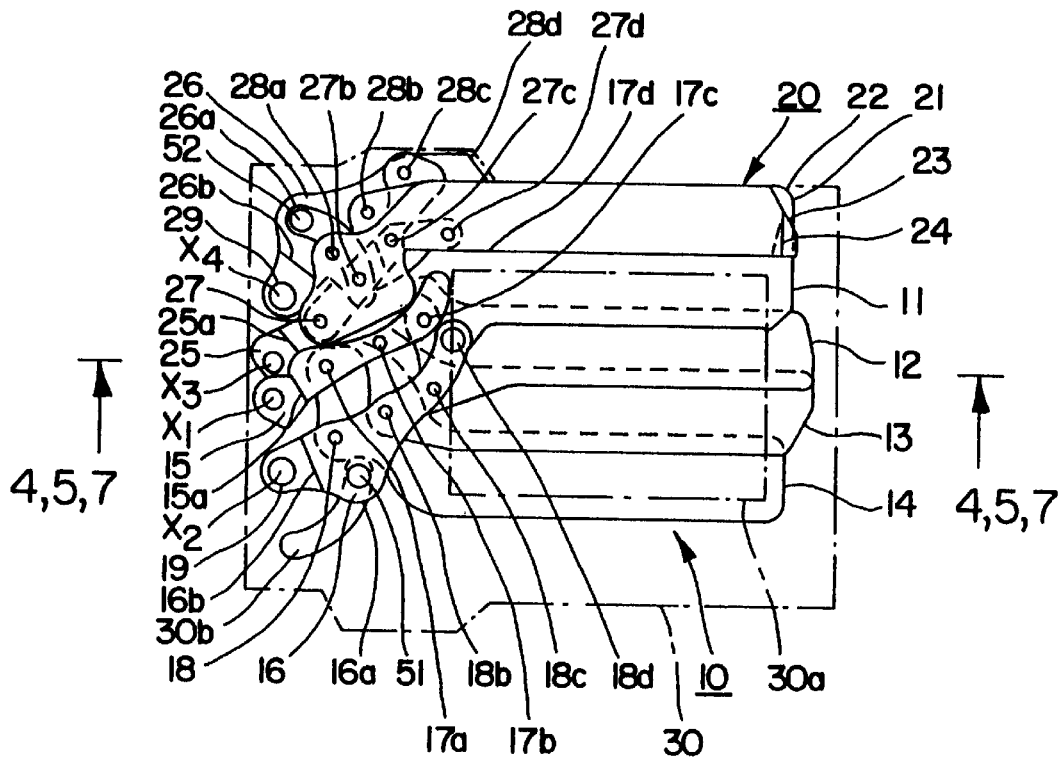
FIG. 2 is a plan view of a focal plane shutter device in accordance with the preferred embodiments, in which charging has been completed.
Figure 3:
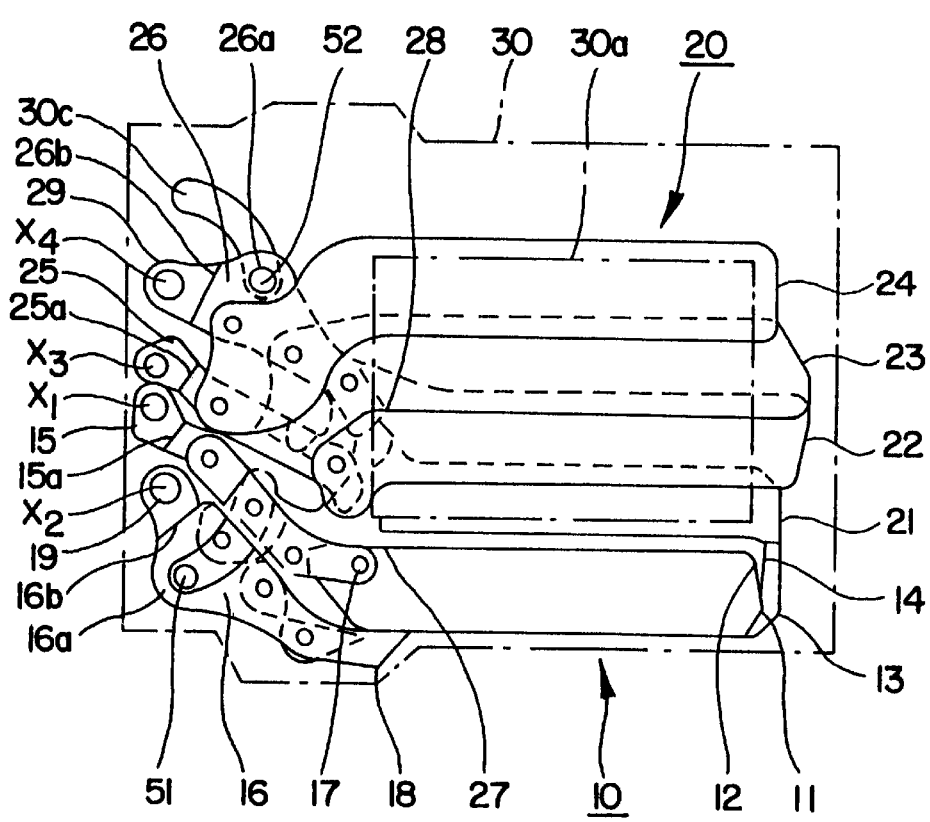
FIG. 3 is a plan view of a focal plane shutter device in accordance with the preferred embodiments, after an exposure has been completed.

FIG. 1 is an exploded oblique view of a focal plane shutter device 5 in accordance with a first preferred embodiment of the present invention. FIG. 2 is a plan view of the focal plane shutter device 5 in accordance with the preferred embodiments of the present invention, in which charging has been completed. FIG. 3 is a plan view of the focal plane shutter device 5 in accordance with the preferred embodiments of the present invention, after an exposure has been completed.

As shown in FIG. 1, the focal plane shutter device 5 generally comprises a light screening plate 41 and an intermediate plate 42 located between a first baseplate 30, positioned on a lens side of the focal plane shutter device 5, and a second baseplate 31, positioned on a film side of the focal plane shutter device 5. The light screening plate 41 is positioned next to the first baseplate 30, while the intermediate plate 42 is positioned next to the second baseplate 31. A front blind group 10 is housed between the light screening plate 41 and the first baseplate 30. A rear blind group 20 is housed between the intermediate plate 42 and the second baseplate 31.

The first baseplate 30 and the second baseplate 31 are provided with apertures 30a and 31a (also referred to as "exposure apertures"), respectively, through which light rays pass to expose a film. The light screening plate 41 and the intermediate plate 42 are also provided with apertures 41a and 42a (also referred to as "exposure apertures"), respectively, through which light rays pass.

The front blind group 10 comprises a plurality of divided blades 11–14 (also known as "light screening blades"). A front blind main arm 16 (alternately referred to as a "drive arm" or a "first drive arm"), is coupled to a front blind follower arm 15 (alternately referred to as a "drive arm" or a "second drive arm"). The front blind follower arm 15 is rotatably coupled by a pin $X_1$ to the first baseplate 30 and the second baseplate 31 (see FIG. 2). Similarly, the front blind main arm 16 is rotatably coupled by a pin $X_2$, via a collar 19, to the first baseplate 30 and the second baseplate 31. The front blind group 10 is movable between an open position (open, folded back or superimposed state), which allows light to pass through the apertures 30a and 31a and reach the film, and a closed position (blocking, cutoff, light-screening or unfolded state), covering the apertures 30a and 31a, thereby preventing exposure of the film.

The divided blades 11–14 are rotatably linked by caulking pins 17a–17d (see FIG. 2) to the front blind follower arm 15 and by caulking pins 18a–18d (see FIG. 2) to the front blind main arm 16.

A drive shaft 51 (see FIG. 2) is mounted in a hole 16a on the front blind main arm 16. The drive shaft 51 passes through an arcuate slot 30b in the first baseplate 30, and links to a drive mechanism (not shown) mounted on the first baseplate 30. The drive shaft 51 moves in the arcuate slot 30b in accordance with a drive force imported by a drive mechanism (not shown). The movement of the drive shaft 51, causes the front blind group 10, comprising the divided blades 11–14, to move between the open position and the closed position, thereby opening and/or closing the apertures 30a and 31a. The drive shaft 51 is braked by a known brake mechanism (not shown) near the end of the exposure operation.

The rear blind group 20 generally comprises four divided blades (also known as "light-screening blades") 21–24. The divided blades 21–24 are rotatably linked by caulking pins 27a–27d (see FIG. 2) to a rear blind follower arm 25 (alternately referred to as a "drive arm" or a "first drive arm"). The divided blades 21–24 are linked to a rear blind main arm 26 (alternately referred to as a "drive arm" or a "second drive arm") by caulking pins 28a–28d. The rear blind follower arm 25 is rotatably linked to a pin $X_3$ extending between the first baseplate 30 and the second baseplate 31. The rear blind main arm 26 is rotatably linked, via a collar 29, to a pin $X_4$ extending between the first baseplate 30 and the second baseplate 31.

A drive shaft 52 is mounted in a hole 26a of the rear blind main arm 26. The drive shaft 52 passes through an arcuate slot 30c in the first baseplate 30 and links to the drive mechanism (not shown). The drive shaft 52 moves in the arcuate slot 30c in accordance with the drive force imported by the drive mechanism. The movement of the drive shaft 52 causes the rear blind group 20, comprising the divided blades 21–24, to move between an open position (open, folded back, or superimposed state) and a closed position (blocking, cut-off, light-screening or folded state), thereby opening and/or closing the apertures 30a and 31a. The drive shaft 52 is braked by a well-known brake mechanism (not shown) near the end of the exposure operation.

Arcuate slots 31b and 31c are disposed in the second baseplate 31 in similar positions to the arcuate slots 30b and 30c. The arcuate slots 31b and 31c support, and prevent interference of, the drive shafts 51 and 52.

Prior to exposure, the rear blind group 20 is in the open position and the front blind group 10 is in the closed position state as shown in FIG. 2. The drive shaft 51 is caused to move in a downward direction, by the drive mechanism, along the arcuate slot 30b of the shutter first baseplate 30 and the arcuate slot 31b of the second baseplate 31. The movement of the drive shaft 51 causes the front blind follower arm 15 and the front blind main arm 16 to move, causing the divided blades 11–14 of the front blind group 10 to commence traveling from the closed position, shown in FIG. 2, to the open position, shown in FIG. 3. The divided blades 11–14 reach the open position on the lower side of the aperture 30a of the first baseplate 30. At this point, an exposure operation is commenced.

After the commencement of travel of the front blind group 10, at a time determined by the shutter speed, the drive shaft 52 moves in a downward direction along the arcuate slots 30c and 31c. The rear blind follower arm 25 and the rear blind main arm 26 move causing the divided blades 21–24 of the rear blind group 20 to commence traveling from the open position in the upper side of the aperture 30a, as shown in FIG. 2. As shown in FIG. 3, the divided blades 21–24 eventually reach the closed position. At this point, the exposure operation ends. Near the end of the exposure operation, the drive shafts 51 and 52 are braked by a brake mechanism (not shown).

After the exposure operation, a charging operation is performed by a charging mechanism (not shown), causing the focal plane shutter device 5 to return to the state shown in FIG. 2.

Figure 4:
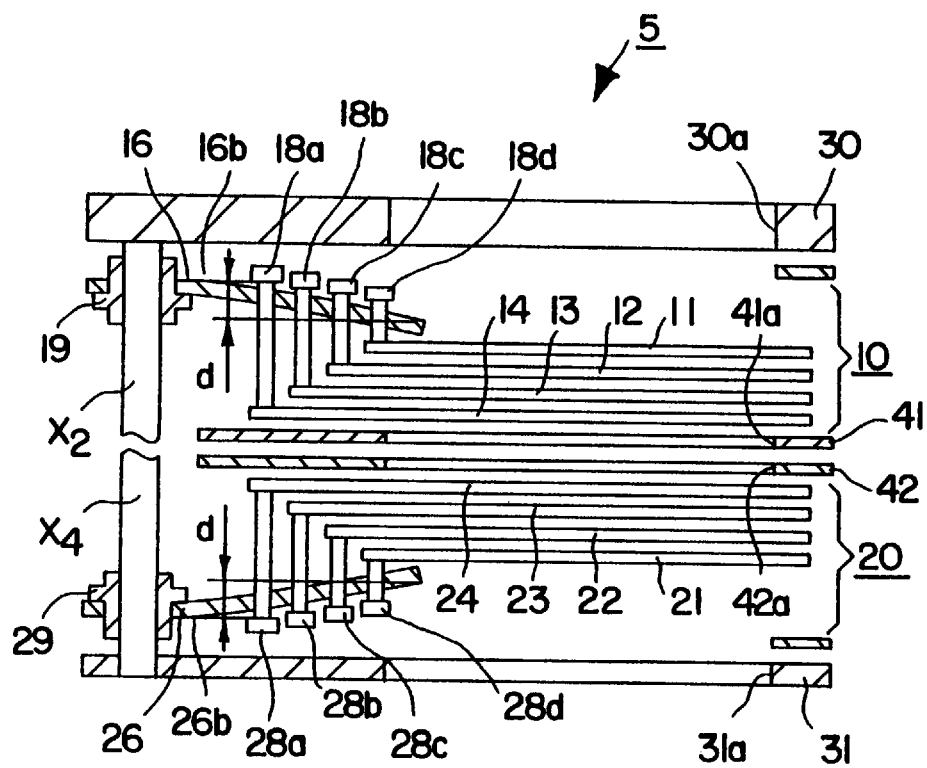
FIG. 4 is a cross sectional diagram along 4—4 of FIG. 2 in accordance with a first preferred embodiment of the present invention.

FIG. 4 is a cross sectional diagram along 4—4 of FIG. 2 in accordance with a first preferred embodiment of the present invention. The pin $X_2$ is shown in cross-section with caulking pins 18a–18d, which are successively arrayed in a line on the front blind main arm 16. The pin $X_4$ is shown in cross-section with caulking pins 28a–28d, which are successively arrayed in line on the rear blind main arm 26.

The collar 19 is mounted on the front blind main arm 16. The pin $X_2$ passes through the collar 19. Moreover, the front blind main arm 16 has a curved portion 16b disposed between the collar 19 and the caulking pin 18a. The curved portion 16b is constituted by a portion of convex curvature (ridge portion), facing the first baseplate 30, and a portion of concave curvature (trough portion), facing the front blind group 10. The front blind main arm 16 is bent by a length d, with respect to the mounting portion of the collar 19, away from the first baseplate 30 (in the direction closer to the divided blades 11–14).

Similarly, the collar 29 is mounted on the rear blind main arm 26. The pin $X_4$ passes through the collar 29. Moreover, a bend portion 26b is disposed in the rear blind main arm 26 between the collar 29 and the caulking pin 28a. The bend portion 26b is constituted by a convex bend portion (ridge portion), facing the second baseplate 31, and a concave bend portion (trough portion), facing the rear blind group 20. The rear blind main arm 26 is bent by a length d, with respect to the mounting portion of the collar 29, away from the second baseplate 31 (in the direction closer to the divided blades 21–24).

Figure 5:
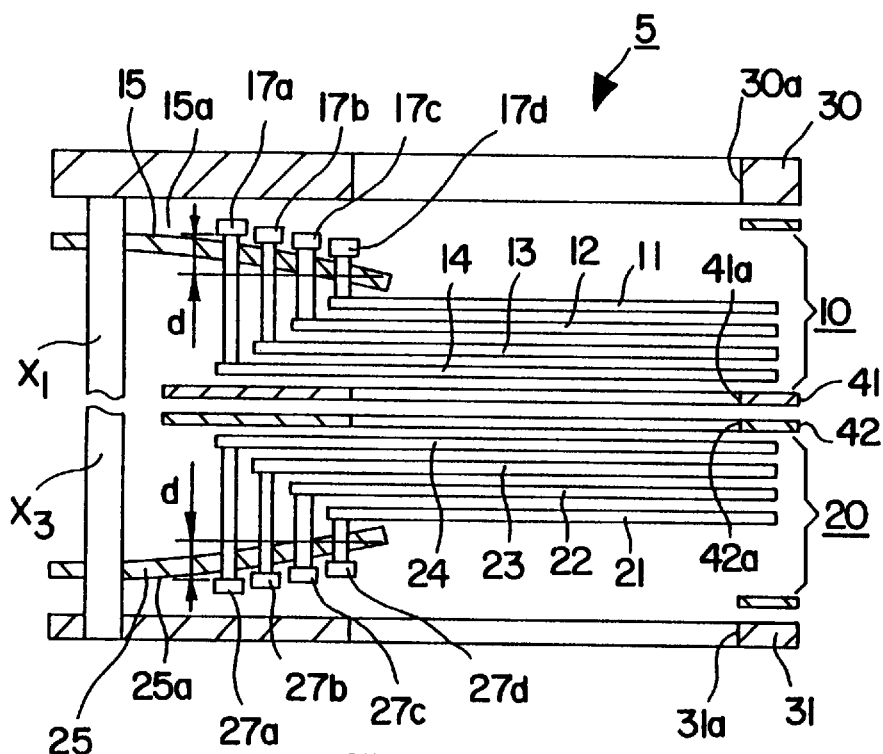
FIG. 5 is a cross sectional diagram along 5—5 of FIG. 2 in accordance with the first preferred embodiment of the present invention.

FIG. 5 is a cross sectional diagram along 5—5 of FIG. 2 in accordance with the first preferred embodiment of the present invention. The pin $X_1$ is shown with caulking pins 17a–17d, which are successively arrayed in a line on the front blind follower arm 15. The pin $X_3$ is shown with caulking pins 27a–27d, which are successively arrayed in a line on the rear blind follower arm 25.

The pin $X_1$ is inserted through the front blind follower arm 15. The front blind follower arm 15 has a bend portion 15a disposed between the pin $X_1$ and the caulking pin 17a. The bend portion 15a is constituted by a convex bend portion (ridge portion), facing the first baseplate 30, and a concave bend portion (trough portion), facing the front blind group 10. The front blind follower arm 15 is bent by a length d, with respect to the portion through which the pin $X_1$ is inserted, away from the first baseplate 30 (in the direction closer to the divided blades 11–14).

Similarly, a pin $X_3$ is inserted through the rear blind follower arm 25. The rear blind follower arm 25 has bend portion 25a disposed between the pin $X_3$ and the caulking pin 27a. The bend portion 25a is constituted by a convex bend portion (ridge portion), facing the second baseplate 31, and a concave bend portion (trough portion), facing the rear blind group 20. The rear blind follower arm 25 is bent, with respect to the position through which the pin $X_3$ is inserted, by a length d away from the second baseplate 31 (in the direction closer to the divided blades 21–24).

The bend portions 15a, 16b, 25a and 26b are disposed in the front blind main arm 16, front blind follower arm 15, rear blind main arm 26, and rear blind follower arm 25, respectively, by bending in a direction away from the first baseplate 30, or the second baseplate 31, whichever is closer. The bend portions 15a, 16b, 25a, and 26b prevent friction between the caulking pins 17a–17d, 18a–18d, 27a–27d and 28a–28d, and the first baseplate 30 or the second baseplate 31. As a result, the operation of the front blind group 10 and the rear blind group 20 is more stable and predictable than with the known art.

Figure 6:
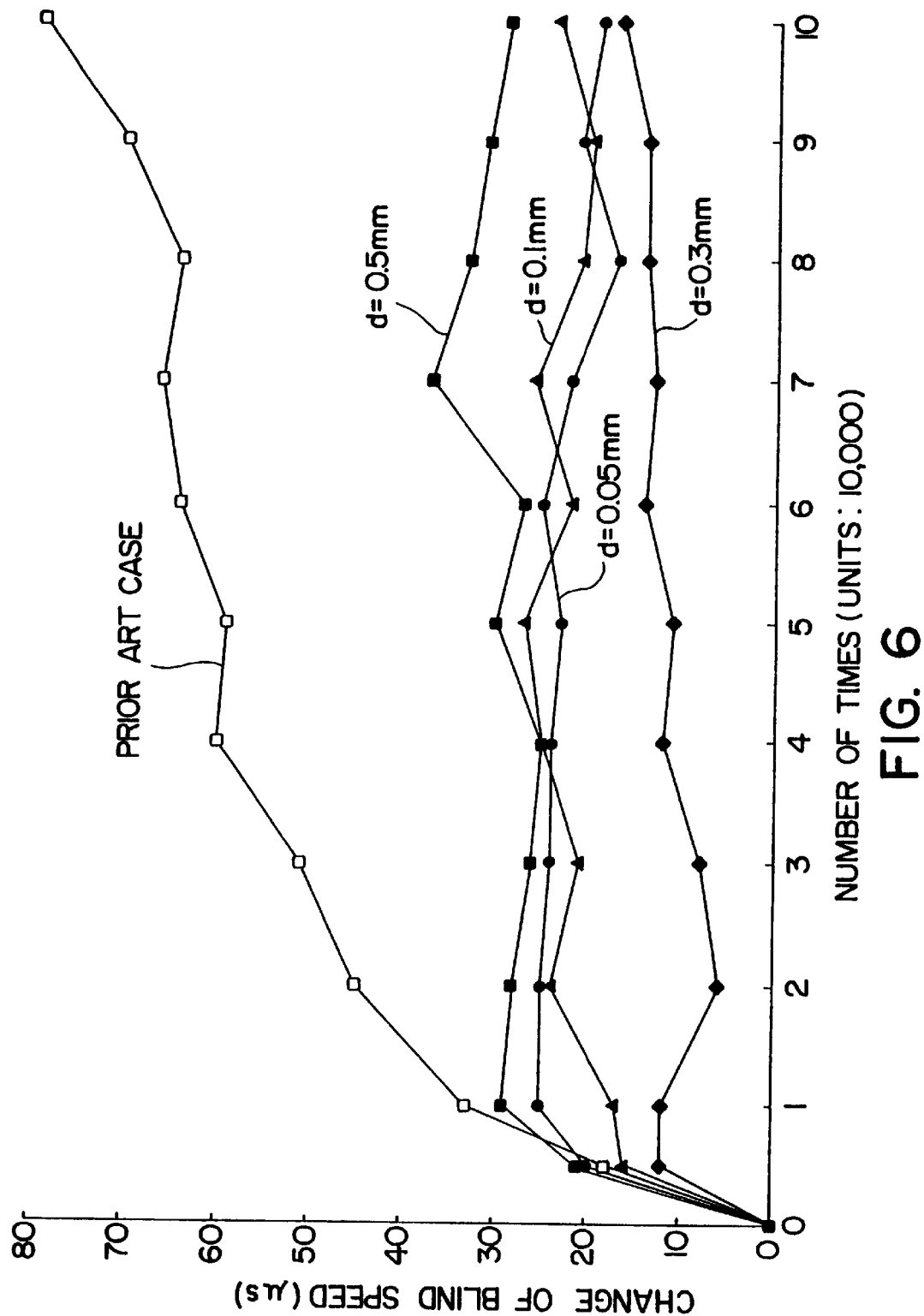
FIG. 6 is a graph showing the relationship between the amount of change of the shutter blind speed and the number of shutter operations.

FIG. 6 is a graph showing the relationship between the amount of change of the shutter blind speed and the number of shutter operations. Specifically, FIG. 6 shows the results of testing the amount of change of the shutter blind speed (as measured from the time the front blind group 10 begins to open to the complete opening, or from the time the rear blind 20 begins to close to the time of complete closing) as the number of operations of the shutter increases.

The results of this test show that, in the prior art, lacking bend portions in any of the blade drive arms, as the number of shutter operations increases, the amount of change of the shutter blind speed substantially increases. In contrast to this, in accordance with the preferred embodiments of the present invention having bend portions disposed in the drive arms 15, 16, 25 and 26, the change in shutter blind speed is minimal for each repeated operation. The amount of change of blind speed with straight arms when the shutters were caused to operate 100,000 times is in the rage 60–100 $\mu$s. In contrast, the change of the blind speed with bent arms is in the range 30–50 $\mu$s. In accordance with the preferred embodiment, the acceptable range of d is 0.05 mm –0.5 mm. However, further testing has revealed that a range of 0.05 mm–0.3 mm is preferable.

Although the first embodiment of the present invention has been described with respect to a specific configuration, it will be recognized that the first embodiment is not limited to the specific configuration.

Figure 7:
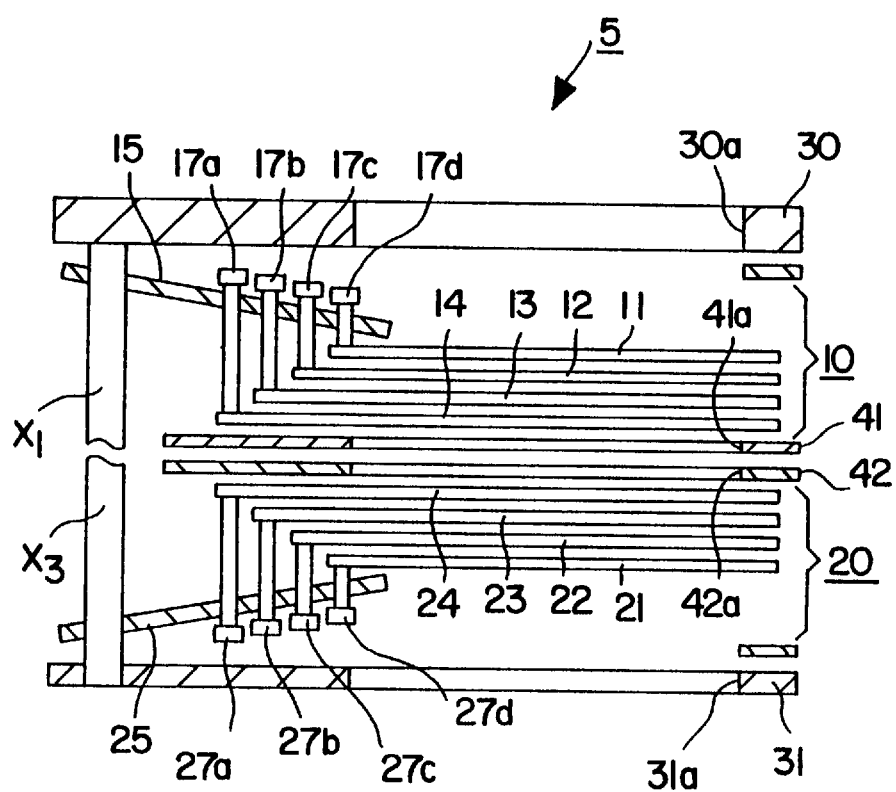
FIG. 7 is a cross sectional diagram along 7—7 of FIG. 2 in accordance with a second preferred embodiment of the present invention.

FIG. 7 is a cross sectional diagram along 7—7 of FIG. 2 in accordance with a second preferred embodiment of the present invention. The point of difference from the first preferred embodiment is that the front blind follower arm 15 and the rear blind follower arm 25 are not bent. Namely, in accordance with the second preferred embodiment, the front blind main arm 16 and the rear blind main arm 26 are the same as in FIG. 4, but the front blind follower arm 15 and the rear blind follower arm 25 are straight as shown in FIG. 7. In accordance with the second preferred embodiment, results approximately equal to those attained in accordance with the first preferred embodiment are obtained. As the results for the second embodiment are approximately the same, a graph similar to FIG. 6 is omitted. Although the second embodiment of the present invention has been described with respect to a specific configuration, it will be recognized that the second embodiment is not limited to the specific configuration.

By means of the preferred embodiments of the present invention as described hereinabove, bend portions are disposed in the shutter drive arms (convex bend portion facing the baseplate side, concave bend portion facing the shutter blade side). By bending the shutter drive arms away from the baseplate adjacent to each arm, the travel time of the blades becomes more consistent. Further, the change in the blind speed according to the number of operations of the shutter decreases. As a result, greater precision of shutter operation is obtained, regardless of the number of times the shutter is opened.

Although a few preferred embodiments of the present invention have been shown and described, it would be appreciated by those skilled in the art that changes may be made in these embodiments without departing from the principles and spirit of the invention, the scope of which is defined in the claims and their equivalents.

In general, in the preferred embodiments of the present invention, bend portions are disposed in the drive arms which drive shutter blades. The convex portions (ridge portions) of the bend portions face the neighboring shutter baseplate side, i.e. facing the side opposite to the side of said drive arm on which the blades are mounted. While the drive arms have been described as being used in a focal plane shutter device, their application is not limited to this application. In general, they can be utilized anywhere a shutter mechanism is required, for example digital cameras, microscopes, and other optical and electrical devices.

What is claimed is:

1. A focal plane shutter device comprising:
    a shutter baseplate;
    a drive arm movably supported by said shutter baseplate, the drive arm having a bend portion with a ridge portion on a side facing the shutter baseplate and a trough portion on an opposite side; and
    at least one shutter blade supported by said drive arm.

2. A focal plane shutter device, as in claim 1, wherein the drive arm is disposed so as to bend away from said shutter baseplate.

3. A focal plane shutter device, as in claim 1, wherein one end of said drive arm is bent from 0.05 to 0.5 mm away from said shutter baseplate.

4. A focal plane shutter device, as in claim 1, wherein said at least one shutter blade is a plurality of shutter blades;

said drive arm supports each of said plurality of shutter blades at different positions; and the bend portion of said drive arm is disposed between a position where the drive arm is supported on said shutter baseplate, and a position where said drive arm support said plurality of shutter blades.

5. A drive arm for a shutter comprising:

a first portion rotatably supported by the shutter;

a second portion adapted to receive a supporting mechanism of at least one shutter blade; and a bent portion between said first portion and said second portion.

6. A drive arm, as set forth in claim 5, wherein said bent portion displaces a far end of said second portion between 0.05 mm and 0.5 mm from a plane defined by said first portion.

7. A shutter device comprising:

a baseplate provided with an aperture;

a plurality of shutter blades; and a drive arm having a first end rotatably supported by said baseplate and adapted to move said plurality of shutter blades from a closed position covering the aperture to an open position allowing light through the aperture, the drive arm having a second end being bent away from said baseplate.

8. A shutter device comprising:

a first baseplate provided with a first aperture;

a second baseplate provided with a second aperture;

a front blind group;

a front blind main arm having a first end rotatably supported between said first baseplate and said second baseplate, said front blind main arm having a second end bent away from said first baseplate with respect to the first end of said front blind main arm; and a front blind follower arm rotatably supported at a first end between said first baseplate and said second baseplate, said front blind follower arm cooperating with said front blind main arm to move said front blind between a closed position blocking the first and second apertures and an open position allowing light to pass through the first and second apertures.

9. A shutter device, as set forth in claim 8, wherein a second end of said front blind follower arm is bent away from said first baseplate with respect to the first end of said front blind follower arm.

10. A shutter device, as set forth in claim 8, further comprising:

a rear blind;

a rear blind main arm having a first end rotatably supported between said first baseplate and said second baseplate, said rear blind main arm having a second end bent away from said second baseplate with respect to the first end of said rear blind main arm; and a rear blind follower arm rotatably supported at a first end between said first baseplate and said second baseplate, said rear blind follower arm cooperating with said rear blind main arm to move said rear blind between a closed position blocking the first and second apertures and an open position allowing light to pass through the first and second apertures.

11. A shutter device, as set forth in claim 10, wherein:

a second end of said front blind follower arm is bent away from said first baseplate with respect to the first end of said front blind follower arm; and a second end of said rear blind follower arm is bent away from said second baseplate with respect to the first end of said rear blind follower arm.

* * * * *